United States Patent [19]

Yuchi et al.

[11] Patent Number: 4,930,095

[45] Date of Patent: May 29, 1990

[54] OUTPUT CORRECTION SYSTEM FOR ANALOG SENSOR

[75] Inventors: Sadataka Yuchi; Haruchika Machida, both of Sagamihara; Naoya Matsuoka; Masamichi Kikuchi, both of Yokohama, all of Japan

[73] Assignee: Hochiki Corp., Tokyo, Japan

[21] Appl. No.: 854,937

[22] Filed: Apr. 23, 1986

[30] Foreign Application Priority Data

Apr. 26, 1985 [JP] Japan .................................. 60-90093

[51] Int. Cl.[5] ........................ G06F 15/20; G08B 17/10

[52] U.S. Cl. .......................... 364/571.01; 364/571.02; 364/571.05; 364/573; 364/577; 340/825.06; 73/1 R

[58] Field of Search ................ 340/511, 825.06, 825.1, 340/825.11; 364/571, 571.01, 571.02, 571.05, 571.08, 571.06, 573, 577; 73/1 R

[56] References Cited

U.S. PATENT DOCUMENTS 3,960,497 6/1976 Acord ............................ 364/571.01
4,059,982 11/1977 Bowman ............................ 364/557
4,446,715 5/1984 Bailey .................................. 73/1 R
4,525,700 6/1985 Kimura et al. ...................... 340/511
4,556,873 12/1985 Yamada et al. .................... 340/511
4,578,762 3/1986 Wong ............................ 364/571.01

*Primary Examiner*—Parshotam S. Lall
*Assistant Examiner*—Ellis B. Ramirez
*Attorney, Agent, or Firm*—Lackenbach, Siegel, Marzullo & Aronson

[57] ABSTRACT

This invention is directed to an output correction system for an analog sensor which outputs an analog signal corresponding to a quantity of state. The output correction system for the analog sensor comprises a control section which receives an output from the analog sensor obtained under condition where the quantity of state is zero and an output from the analog sensor obtained under pseudo-condition equivalent to a certain quantity of state; a first arithmetic section for calculating a gradient on the basis of the output under the zero condition and the output under the pseudo-condition; a storage section for storing output characteristics defined by said gradient; and a second arithmetic section for calculating a quantity of state corresponding to the output from the analog sensor on the basis of the output characteristics defined by the gradient.

15 Claims, 9 Drawing Sheets

OUTPUT CORRECTION SYSTEM FOR ANALOG SENSOR

BACKGROUND OF THE INVENTION AND RELATED ARTS

This invention relates to a system for correcting an output of an analog sensor which outputs an analog signal corresponding to a quantity of state a physical quantity such as a smoke density or a temperature.

As an output correction system for an analog sensor, there have been known a zero adjusting system and a span adjusting system. For example, in the case where a current of 4 to 20 mA is output for a change in a temperature or a smoke density, amplification characteristics of an output amplifier provided in the analog sensor are adjusted to adjust a zero point and a span (linear adjustment) of output characteristics.

However, in such a conventional output correction system, it is necessary for each analog sensor to adjust its output characteristics and thus it takes much time to set completely all of the sensors. And also this makes the adjustment operation complicated and prevents accurate analog outputs from being obtained.

SUMMARY OF THE INVENTION

The present invention has been achieved to obviate the problems involved in the conventional techniques and it is an object of the present invention to provide an output correction system for an analog sensor which is capable of providing a true quantity of state or true value of a physical quantity from an analog output of an analog sensor, irrespective of the output characteristics of the analog sensor.

To attain the object, the present invention features an output correction system for an analog sensor which outputs an analog signal corresponding to a given quantity of state, comprising a first arithmetic section which detects an output from the sensor when the quantity of state is zero and an output from the sensor when a pseudo-condition is produced equivalent to a predetermined quantity of state, and calculates a gradient on the basis of said output under the condition of the zero quantity of state and said output under said pseudo-condition. The system further comprises a second arithmetic section for computing a quantity of state corresponding to an output of the analog sensor on the basis of the sensor output characteristics defined by said gradient.

PREFERRED EMBODIMENTS OF THE INVENTION

Figure 1:
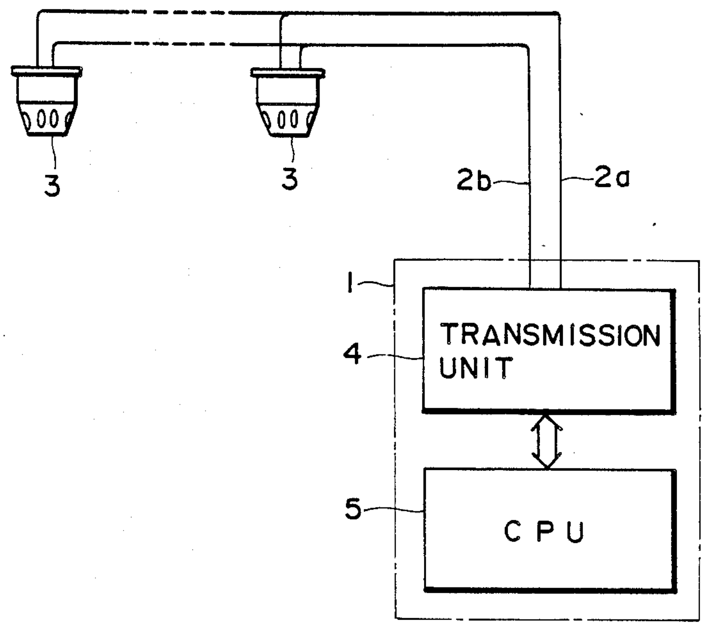
FIG. 1 is a block diagram of a system for correcting an output of an analog sensor according to a first embodiment of the present invention.

Preferred embodiments of the present invention will now be described, referring to the drawings.

According to a first embodiment illustrated in FIGS. 1 to 7, a correcting system for an output of an analog sensor comprises a central signal station 1 and a plurality of analog fire detectors 3 which are connected in parallel with each other to a pair of power/signal lines **2*a*, 2*b* derived from the central signal station 1. The central signal station 1 includes a transmission unit 4 which controls transmission of analog data from the analog fire detectors 3 by polling and a central processing unit (CPU) 5** which corrects the analog data obtained by polling and makes a fire determination on the basis of the corrected analog data.

Figure 3:
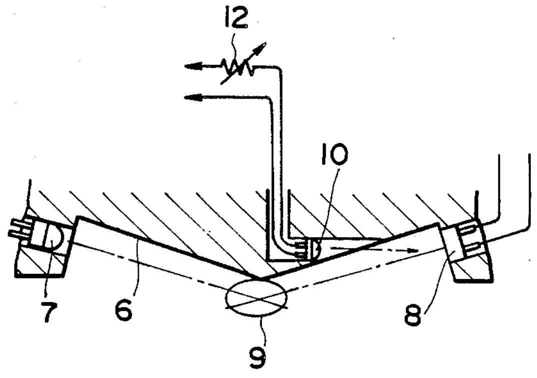
FIG. 3 is an explanatory view of the inner structure of an analog-type photoelectric smoke detector shown in FIG. 1.

The analog fire detector 3 employed in the present invention may be a scattered-light type photoelectric smoke detector as illustrated in FIG. 3 which detects a density of smoke caused by a fire in the form of an analog signal amount.

As illustrated in FIG. 3, LED 7 of a light-emitting element and a photodiode 8 of a photo detector are mounted oppositely on a holder 6 disposed within a smoke detecting chamber of the detector at such angles that light from LED 7 is not directly impinged upon the photodiode 8. The light from LED is irregularly reflected by particles of smoke entering a smoke detecting area 9 and the scattered light is incident upon the photodiode 8 to produce an analog signal corresponding to the density of smoke. The analog fire detector 3 further has a test LED 10 mounted on the holder at a position opposite to the photodiode 8 so that the photodiode 8 may receive the light from the test LED 10 directly.

This test LED is adapted to emit a light amount corresponding to the amount of scattered light obtained at a predetermined smoke density (for example, a smoke density of 5%/m which is a critical density for giving a fire detection signal). With this setting, the photodiode 8 outputs an analog signal corresponding to the smoke density of 5%/m.

The amount of light may be adjusted by a variable resistor 12 to provide a pseudo-condition of entering smoke of the predetermined density by the test LED 10. The adjustment for producing the psuedo-smoke density by the test LED 10 is carried out as follows. When the assembling of an analog photoelectric smoke detector has been completed at a factory, smoke of the predetermined density (for example, a smoke density of 5%/m) is actually introduced to the smoke detector to measure an analog output (for example, an analog output current) obtained from the smoke detector at the predetermined smoke density. Subsequently, the test LED 10 is driven to emit light under the condition where no smoke enters the detector and then the amount of light emitted by the test LED 10 is adjusted by the variable resistor 12 until the analog output current of the detector is equivalent to that produced by smoke having the predetermined density.

Once the adjustment of the light amount of the test LED has been completed, light of an amount corresponding to the scattered light obtainable upon entering of smoke having the predetermined density may be supplied to the photodiode 8 by driving the adjusted test LED 10 and without actually introducing smoke of the predetermined density into the detector. Thus, a pseudo-condition equivalent to that in which smoke of the predetermined density is in the detector can be produced.

In this connection, it is to be noted that since the test LED 10 is disposed near the photodiode 8, the amount of light will hardly be changed even after a long use. This assures that a constant pseudo-condition of the predetermined smoke density is always produced by driving the test LED 10.

Figure 4:
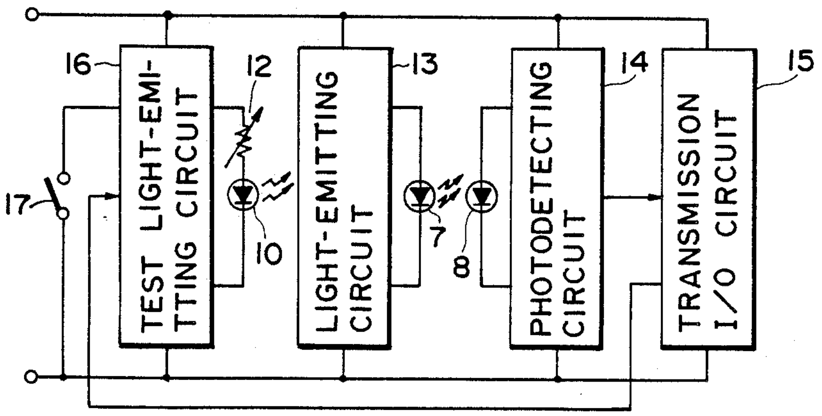
FIG. 4 is a block diagram of a circuit arrangement of the photoelectric analog smoke detector.

FIG. 4 is a block diagram of a circuit arrangement of an analog photoelectric smoke detector to which the correction system of the present invention having an arrangement for producing the pseudo-condition is applied.

In FIG. 4, 13 is a light-emitting circuit for driving LED 7 to emit light intermittently with a predetermined period. 14 is a photodetecting circuit which receives, by the photodiode 8, light scattered by smoke entering the detector and outputs, to a transmission input/output circuit 15, an analog current having characteristics such that the current increases linearly in proportion to an increase of smoke density, for example, the output current is 4 mA at a smoke density of 0%/m and 25 mA at a smoke density of 5%/m, i.e., a critical density for giving a fire detection signal. The transmission input/output circuit 15 discriminates its calling from the central signal station 1 through polling from the transmission unit 4 provided in the central signal station 1 as illustrated in FIG. 1 and transmits an analog signal corresponding to a smoke density by allowing an analog current based on the output from the photodetecting circuit 14 to flow through the power/signal lines 2*a*, 2*b* derived from the central signal station 1 when the transmission input/output circuit 15 discriminates its calling. The transmission input/output circuit 15 drives the test LED 10 to emit light through a test light-emitting circuit 16 upon receipt of a light emission drive signal for the test LED 10 from the central signal station 1 as will be described in detail later. The variable resistor 12 and the test LED 10 are connected in series to an output of the test light-emitting circuit 16. More particularly, the test light-emitting circuit 16 is driven to emit light through test light emission control by the central signal station 1 or operation of a manual switch 17 to produce a pseudo-condition corresponding to smoke of a predetermined density, for example, a density of 5%/m, entering the detector.

The details of CPU 5 provided within the central signal station 1 will be described.

Figure 2:
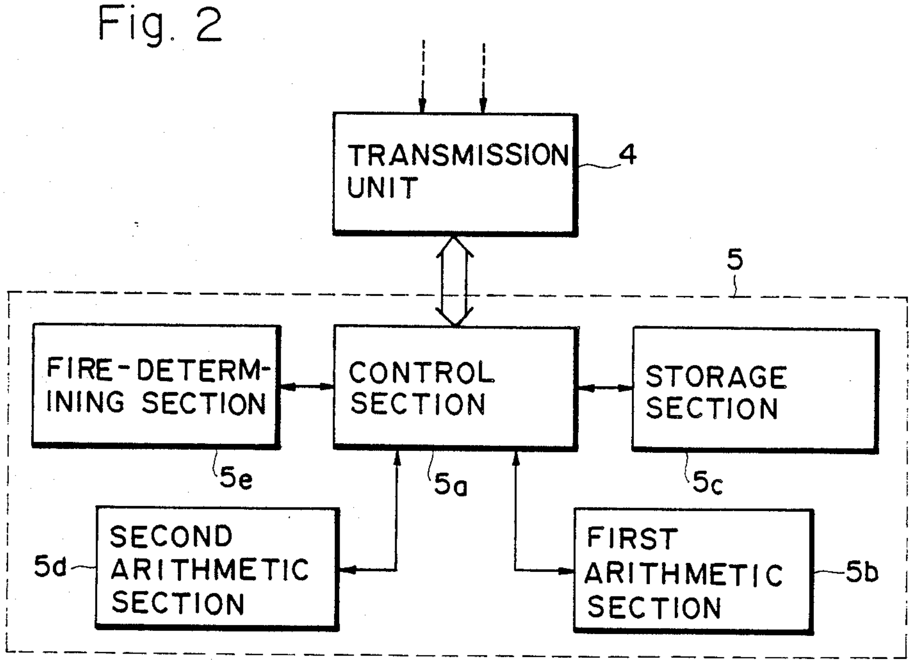
FIG. 2 is a detailed block diagram of a central processing unit (CPU) shown in FIG. 1.

As illustrated in FIG. 2, CPU 5 comprises a control section 5*a*, a first arithmetic section 5*b*, a storage section 5*c*, a second arithmetic section 5*d* and a fire determining section 5*e*. CPU 5 corrects analog data obtained through polling by the transmission unit 4 and makes a fire determination on the basis of the analog data obtained through the correction processing.

Figure 5:
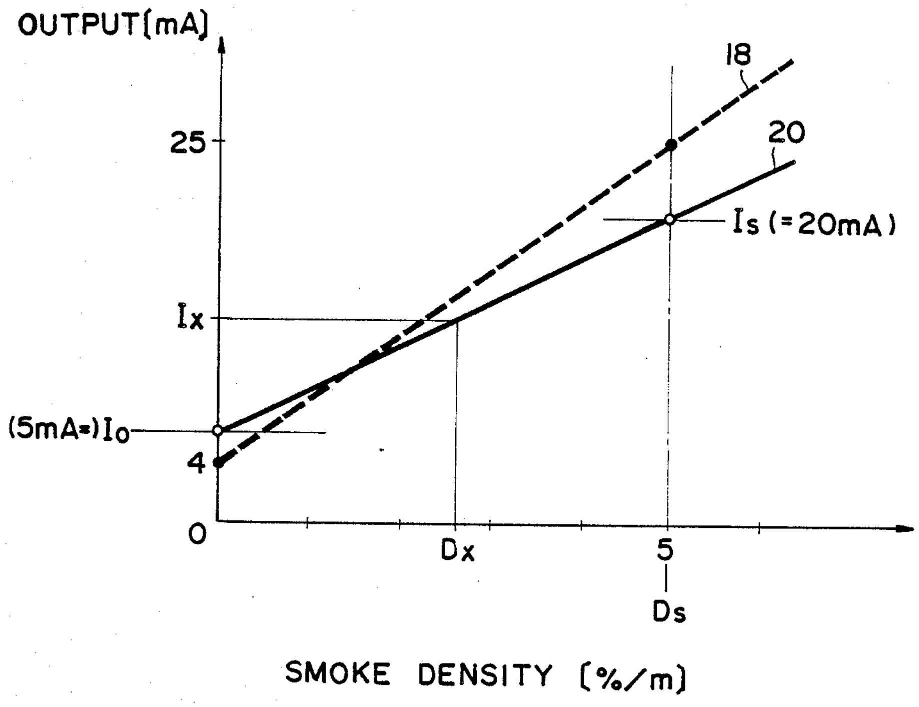
FIG. 5 is a graph showing output characteristics for explanation of FIGS. 1 and 2.

The correction processing is carried out on the basis of the output characteristics of an analog sensor as shown in FIG. 5. In FIG. 5, the abscissa indicates a smoke density and the ordinate indicates an output current. Output characteristics expected for an analog sensor are linear characteristics as indicated by a broken line 18 which, for example, provide an output current of 4 mA at a smoke density of 0%/m and an output current of 25 mA at a smoke density of 5%/m, the critical density for giving a fire detection signal.

However, an actual analog photoelectric smoke detector can not always have characteristics fully conformable to the desired characteristics 18. The actual output characteristics vary between individual detectors. Therefore, the following correction processing is carried out by CPU 5 so as to always obtain a true smoke density from the output current of the detectors even if the individual detectors have characteristics deviated from the expected characteristics 18.

First, an analog output current Io (for example, Io=5 mA) is detected under a condition where the smoke density is zero.

Then, the light amount of the test LED 10 is adjusted to a predetermined smoke density Ds (for example, Ds=5%/m) and the test LED 10 is driven to emit light to produce a pseudo-condition of smoke density of 5%/m. Thereafter, the detector output current Is obtained under this condition is measured. The adjustment and detection are carried out by the control section 5*a*.

Subsequently, a gradient K of a straight line defining the actual output characteristic 20 as indicated by a solid line is computed by the first arithmetic section 5*b* on the basis of the zero output Io=5 mA and the pseudo-output Is=20 mA according to the following formula:

$$K = Ds/(Is - Io)$$

Since Ds=5%/m, Is=20 mA and Io=5 mA, K will be 0.33.

When the gradient K defining the actual output characteristics 20 has been obtained, the gradient constant K and the zero current Io data are stored in the storage section 5*c* and the data is transmitted to the second arithmetic section 5*d*.

With respect to an output current Ix obtained thereafter, the second arithmetic section 5*d* carries out the following calculation $$Dx = K(Ix - Io)$$

to obtain a smoke density Dx corresponding to the actual output current Ix.

The correction processing as described above assures that true smoke density can always be obtained on the basis of the actual analog output current and that accurate fire determination can be carried out on the basis of the thus obtained true smoke density.

Now, the entire operation of the output correction system for an analog sensor will be described referring to FIGS. 6 and 7.

Figure 6:
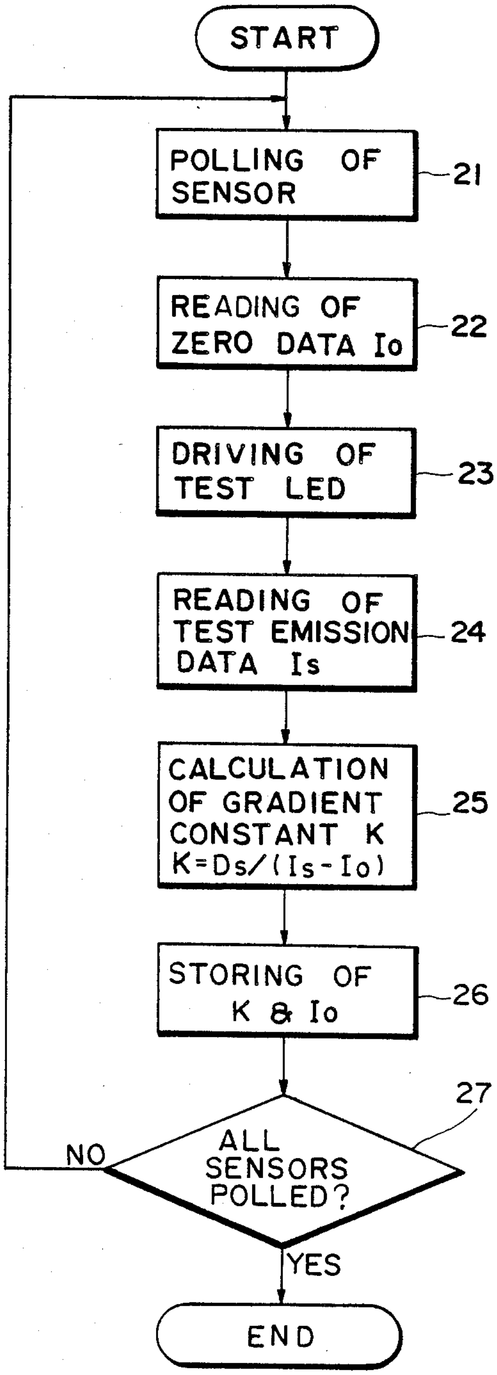
FIGS. 6 and 7 are flowcharts for explanation of FIGS. 1 and 2.

FIG. 6 is a flowchart for the correction processing operation to be carried out by the present correction system. As shown in the figure, processing for obtaining the gradient of a line defining actual output characteristics of an analog fire detector 3 is carried out as an initial processing operation.

The processing operation is initiated a predetermined period of time after a transient state has elapsed following the connection of a power source to the central signal station 1. At block 21, the sensor, i.e., analog fire detector 3 is called by polling and, at block 22, the zero data Io obtained under the condition where the smoke density is zero is read by the control section 5*a*. The reading of the zero data Io by this sensor polling is carried out several times for the same sensor or detector so that an average value of the zero data Io obtained by these polling operations repeated several times is regarded as final zero data Io. Further the average value of the zero data can be calculated by the running average or simple average.

When the reading of the zero data Io has been completed, the step proceeds to block 23 to transmit a single for controlling the light emission of the test LED 10 provided in the detector 3 for driving the test LED 10. At block 24, test light-emission data Is obtained under the pseudo-condition produced by the test light emission is read by the control section 5*a*. The reading of the test light emission data Is is also repeated several times as many as the zero data Io, in response to instructions from the control section 5*a*, and an average value of the test light emission data obtained by the repeated test light emission is read as final test light-emission data Is. Further the average value of the zero data can be calculated by the running average or simple average.

Subsequently, at block 25, the zero data Io, the test light-emission data Is and the present smoke density Ds for test light-emission are read out from ROM in the storage section 5*c* and the gradient constant K of the straight line defining the actual output characteristics is calculated by the first arithmetic section 5*b*.

Thereafter, at block 26, the gradient constant K and the zero data Io are stored in RAM of the storage section 5*c*. After completion of these series of processing operations, the control section 5*a* checks at block 27 as to whether the polling of all the sensors has been finished or not. If finished, the initial processing operation is completed and if not finished, the step returns to block 21 to repeat similar processing operations for the following sensor.

Figure 7:
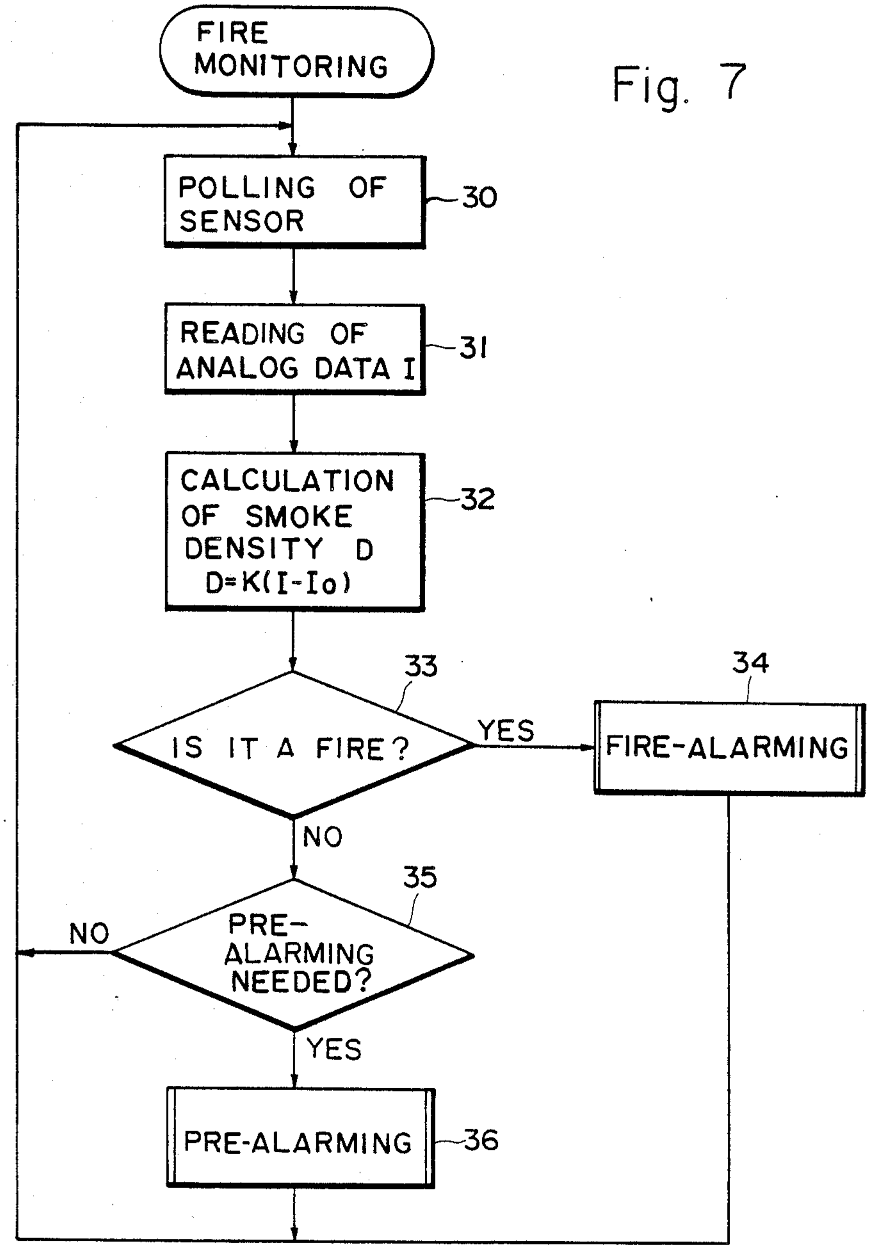

FIG. 7 is a flowchart showing a fire determination processing operation at the central signal station 1 after the gradient constant K and zero data Io of the straight line defining the actual output characteristics have been obtained as shown in FIG. 6.

First, the analog photoelectric smoke detector as an analog sensor is called by polling at block 30. At block 31, the then analog data I is read by the control section 5*a* to transmit the same to the second arithmetic section 5*d*. Thereafter, a smoke density D is calculated, at block 32, on the basis of the gradient constant K and the zero data Io stored in the storage section 5*c* according to the following formula:

$$D = K(I - Io)$$

Thus, a true smoke density D is always obtained irrespective of the output characteristics of the sensor.

When the smoke density D has been obtained, it is checked by the fire determining section 5*e*, at block, 33 whether the smoke density D exceeds a critical smoke density for giving a fire detection signal, for example, 10%/m or not. If the density D exceeds 10%/m, the step proceeds to block 34 to carry out fire processing operation such as fire alarming or indication of fired area. If the density D is lower than 10%/m, the step proceeds to block 35 to compare the density D with a density for giving a pre-alarming, for example, a density of 5%/m. If the density D is higher than 5%/m, the step proceeds to block 36 to carry out a pre-alarming processing operation and if the density D is lower than 5%/m, the step returns to block 30 to carry out polling of the following sensor.

A second embodiment of the present invention will be described referring to FIGS. 8 to 12.

Figure 8:
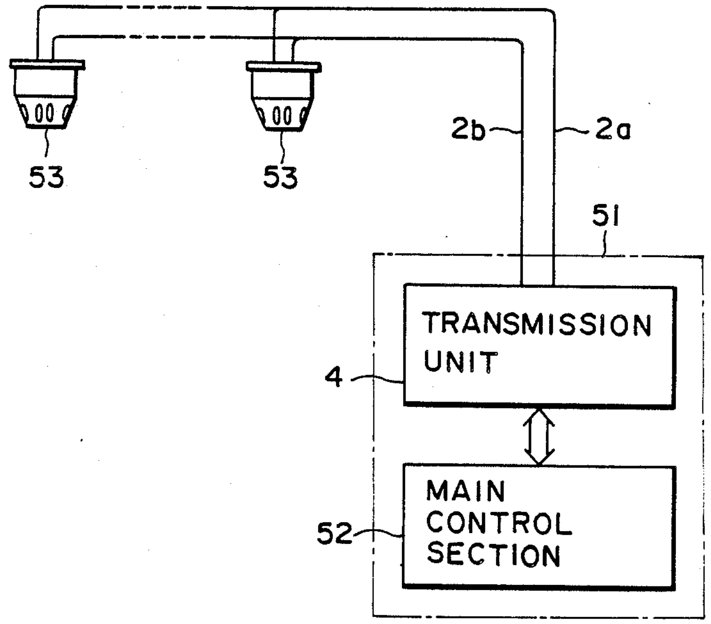
FIG. 8 is a block diagram of a system for correcting an output of an analog sensor according to a second embodiment of the present invention.

An output correction system for an analog sensor according to the present embodiment comprises, as illustrated in FIG. 8, a central signal station 51 comprised of a main control section 52 for controlling the entire system and a transmission unit 4 and a plurality of analog fire detectors 53 connected in parallel with each other to a pair of power/signal lines 2*a*, 2*b* derived from the central signal station 51 so that each of the fire detectors can carry out the correction processing.

Figure 9:
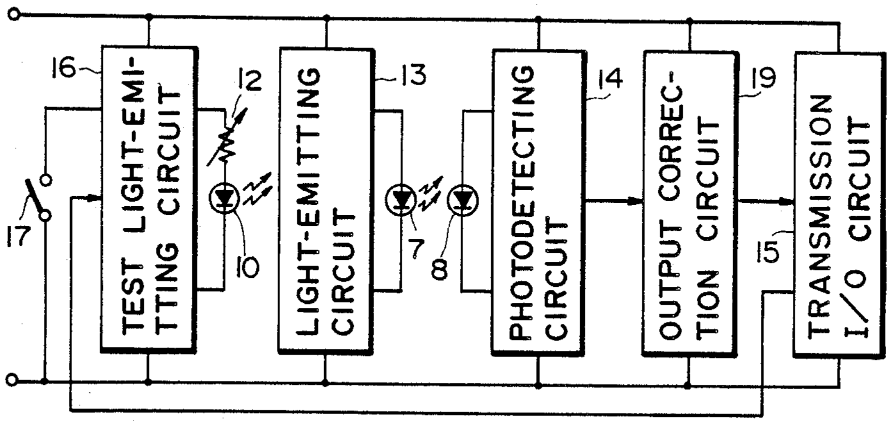
FIG. 9 is a block diagram of a circuit arrangement of another form of analog-type photoelectric smoke sensor.

The fire detector 53 comprises, as illustrated in FIG. 9, a light-emitting circuit 13 to which LED 7 is connected externally, a photodetecting circuit 14 to which a photodiode 8 is connected externally, and a test light-emitting circuit 16 to which a variable resistor 12, a test LED 10 and a manual switch 17 are connected. These circuits are substantially the same, in arrangements and functions, as those employed in the first embodiment. LED 7, the photodiode 8 and the test LED 10 are also identical with those of the first embodiment as illustrated in FIG. 3.

An output correction circuit 19 is connected to the photodetecting circuit 14. This output correction circuit 19 corrects an output current obtained from the photodetecting circuit 14 to the predetermine output characteristics. For example, to output characteristics defined by a line in which the output current is 4 mA at a smoke density of 0%/m and 25 mA at a smoke density of 5%/m, that density being for giving a fire alarm signal, to generate a corrected analog output.

More particularly, the actual output characteristics of the detector depend upon the photodetecting circuit 14 and do not always conform to the expected output characteristics for various reasons, and so they vary among the individual detectors. The output correction circuit 19 carries out output correction processing as will be described in detail later, with respect to such variances in actual output characteristics to generate a current output in conformity with the correct output characteristics for the transmission input/output circuit 15.

This transmission input/output circuit 15 transmits analog data upon receipt of polling from the central signal station 1. More specifically, the transmission input/output circuit 15 discriminates its calling through polling from the central signal station 1 to transmit an output current obtained from the output correction circuit 19 at that time. The transmission input/output circuit 15 is further adapted to receive a control signal for actuating the test light-transmitting circuit 16 according to instructions from the central signal station 1 to transmit the same to the test light-transmitting circuit 16.

The arrangement of the output correction circuit 19 will now be described in detail.

Figure 10:
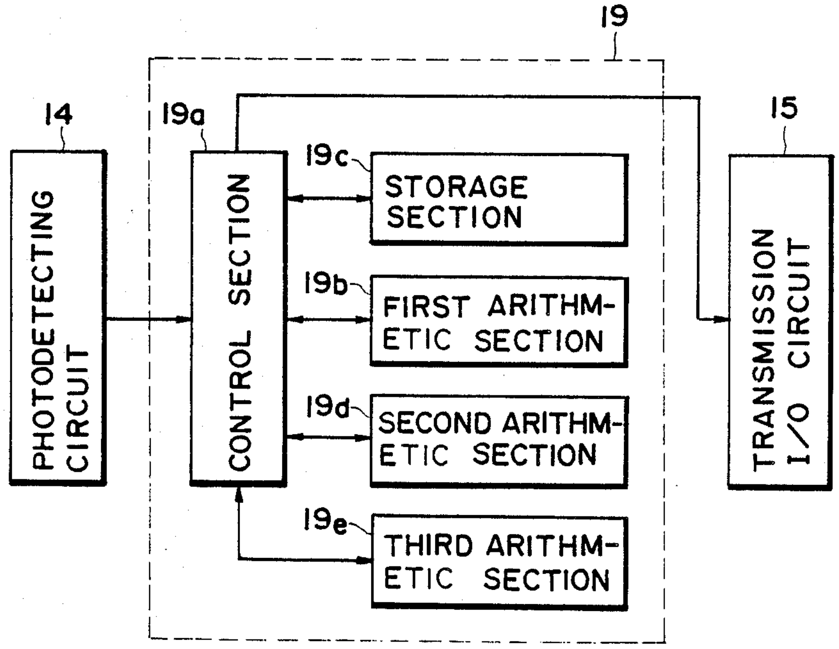
FIG. 10 is a block diagram of an output correction circuit shown in FIG. 9.

The output correction circuit 19 comprises, as illustrated in FIG. 10, a control section 19*a*, a first arithmetic section 19*b*, a storage section 19*c*, a second arithmetic section 19*d* and a third arithmetic section 19*e* for correcting the output current from the photodetecting circuit 14 so as to output the corrected output current to the transmission input/output circuit 15.

Figure 11:
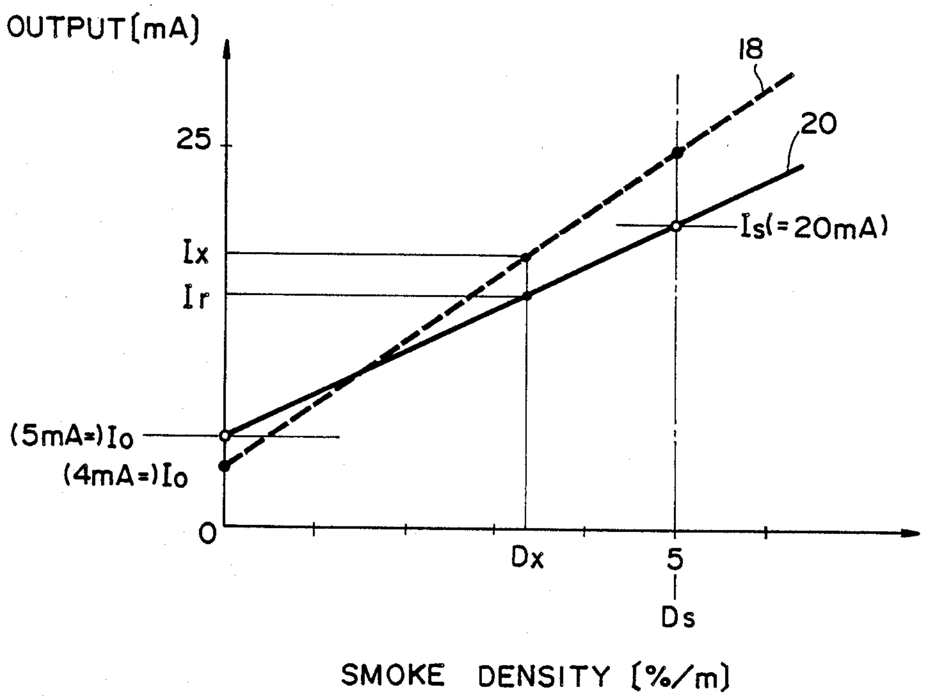
FIG. 11 is a graph showing output characteristics for explanation of FIGS. 9 and 10.

This correction processing is carried out on the basis of output characteristics of an analog sensor as shown in FIG. 11. In FIG. 11, the abscissa indicates a smoke density and the ordinate indicates an output current. The expected correct output characteristics are those indicated by a broken line 18. The correct characteristics 18 are in the form of straight line in which output current Io' is 4 mA at a smoke density of 0%/m and 25 mA at a density of 5%/m for giving a fire detection signal. The gradient Ko of the straight line defining the output characteristics 18 is preliminarily obtained.

On the other hand, the output characteristics of an actual detector are deviated from the correct output characteristics 18 as actual output characteristics 20 designated by a solid line. In the actual output characteristics 20, the output current Io at a smoke density of 0%/m is 5 mA and the output current Is is 20 mA at a pseudo-smoke density Ds of 5%/m produced by the light emission from the test LED 10. The output correction circuit 19, therefore, carries out the processing as will be described below to transmit an output current based on the correct output characteristics even if the actual characteristics are deviated from the correct output characteristics 18.

First, an output current from the sensor is detected under the condition in which the smoke density is zero and, then, the test LED 10 is driven for emitting light to produce a sensor output current Is corresponding to the smoke density Ds. The detection is carried out by the control section **19*a***.

Subsequently, the gradient Kr of the straight line 20 defining the actual characteristics is calculated by the first arithmetic section **19*b*** on the basis of the sensor output Io at a smoke density of zero and the output current Is at the predetermined smoke density Ds as follows:

$$Kr=Ds/(Is-Io) \quad (1)$$

When the gradient Kr of the straight line defining the actual characteristics 20 is thus obtained, the gradient constant Kr and the zero data Io are stored at the storage section **19*c* to transmit the data to the second arithmetic section 19*d***.

With respect to an output current Ir obtained thereafter, the following calculation is carried out by the second arithmetic section **19*d*** to obtain a smoke density Dx when the output current Ir is obtained.

$$Dx=Kr(Ir-Io) \quad (2)$$

On the other hand, since the gradient Ko of the straight line defining the correct output characteristics 18 denoted by a broken line is preliminarily determined, there are the following relationships between the correct output current Ix and the smoke density Dx:

$$Dx=Ko(Ix-Io') \quad (3)$$

$$Ix=(Dx/Ko)+Io' \quad (4)$$

Since the smoke density Dx with respect to the given output current Ir based on the actual characteristics have been obtained by the formula (2), Dx is substituted in the formula (4) to obtain the output current Ix based on the correct output characteristics 18 by the third arithmetic section **19*e***.

The corrected output current is received by the transmission unit 4 through the polling and the main control section 11 makes fire determination on the basis of the analog data obtained through the polling. The main control section 11 further has a function to transmit a control signal to the analog fire detector 53 as interrupt with a predetermined period or by a manual operation to drive the test LED 7 for emitting light so as to calculate the gradient of the line defining the actual output characteristics.

Figure 12:
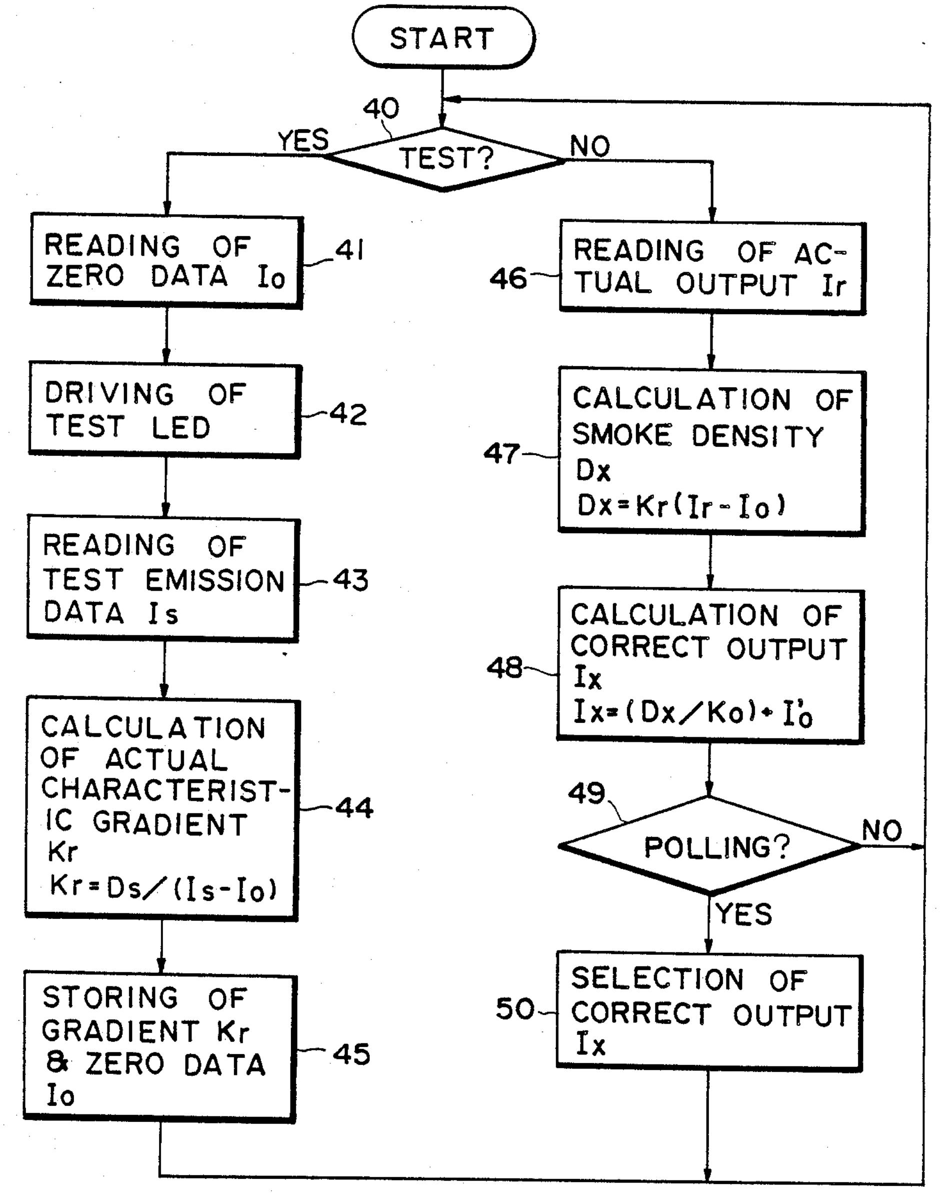
FIG. 12 is a flowchart for explanation of FIGS. 8 to 10.

The entire operation of the output correction system for an analog sensor will be described referring to FIG. 12.

First, the control section **19*a* provided in the output correction circuit 19 checks as to whether the system is in a test mode or not (block 40). When the control signal has been transmitted from the central signal station 1 or the manual switch 17** has been operated, the system is in the test mode. At the time of connection of the fire alarm system to a power source, the system is thrown into the test mode as an initial processing.

When the test mode is discriminated, the step proceeds to block 41 where the control section **19*a* reads the zero data Io at a smoke density of zero. Subsequently, the test LED 10 is driven for emitting light at block 42 and the test light-emission data Is is read at block 43. It is preferred that a plurality of zero data Io and test light-emission data Is be obtained and average values of the respective data be read as final zero data Io and test light-emission data Is at block 41 and block 43**, respectively. Further the average value of the zero data can be calculated by the running average or simple average.

When the zero data Io and the test light-emission data Is have been thus obtained, the step proceeds to block 44 to calculate the gradient Kr of the straight line defining the actual output characteristics by the first arithmetic section **19*b* according to the formula (1). The thus calculated gradient Kr and the zero data Io are stored in the storage section 19*c* at block 45**.

After the processing as described above has been completed, the system is thrown into an ordinary fire monitoring mode and, at block 46, the actual output Ir, namely, the output current Ir from the photodetecting circuit 14 as shown in FIG. 9 is read and, at block 47, the smoke density Dx is calculated by the second arithmetic section **19*d* on the basis of the gradient Kr of the actual characteristics and the zero data Io according to the formula (2). Subsequently, at block 48, the smoke density Dx is substituted to the slope Ko which is constant and to the zero data Io' and the correct output current Ix is calculated by the third arithmetic section 19*e* on the basis of the correct output characteristics according to the formula (4). The control section 19*a* transmits the correct output current Ix to the transmission input/output circuit 15. The transmission input-/output circuit 15 monitors polling from the central signal station 1 at block 49. If there is polling from the central signal station 1, the correct output current Ix is transmitted to the central signal station 1 at block 50**.

Although the scattered-light type photoelectric smoke detector is employed as an analog sensor in the foregoing embodiments, the analog sensor to which the present invention is applied is not limited to this type of smoke detector and extinction type smoke detector or an ionization type smoke detector may alternatively be employed. For example, in the case of the ionization type smoke detector, a pseudo-condition wherein smoke enters at a certain density is produced by electrically changing the potential of an intermediate electrode in an ionization smoke chamber which is provided with an external electrode, the intermediate electrode and an inner electrode including a radiation source. The output correction according to the present invention is realized by obtaining an output current for giving a fire detection signal under the pseudo-condition. The analog sensor to which the present invention is applied is not limited to the sensor for detecting a smoke density or a temperature due to a fire. The output correction system of the present invention is applicable to any sensor which outputs an analog signal corresponding to some suitable quantity of state to obtain a correct quantity of state irrespective of the output characteristics of the sensor. Further, although the calculation for correction is carried out at the sensor or at the central signal station in the foregoing embodiments, a repeater may be employed to carry out such correction calculation and transmit an analog amount or a fire signal to the central signal station.

Further, instead of transmitting analog data to the central signal station, a threshold value of a predetermined level may be set in the sensor to allow only an alarming signal to be transmitted to the central signal station when the analog data exceeds the predetermined level. The threshold value may alternatively be set in the repeater.

We claim:

1. An analog output test and correction system for an analog detector which outputs an analog signal having a varying value representative of the value of a detectable variable physical quantity monitored and detected by the detector, the detector having means for developing a test and sensing signal for sensing and detecting the physical quantity and having means responsive to the test and sensing signal for developing as a function of the value of the physical quantity the analog output signal representative of the physical quantity, the test and correction system comprising, a control section for receiving the analog output of the detector under a condition where the output is representative of a condition where the physical quantity is at zero value and an output from the analog detector under a simulated condition in which the value of the physical quantity is a simulated predetermined value at which the detector detects the physical quantity, said control section having a first arithmetic section for calculating a gradient of values on the basis of the output under the zero value condition and the output under the simulated condition, a storage section for storing said zero value condition output and said gradient of values, and a second arithmetic section for calculating a value of the physical quantity corresponding to the predetermined output value from the analog detector on the basis of the detector output characteristics defined by said zero value condition outputs and said gradient of values of outputs, and means including means in said control section for adjustably correcting and maintaining said test and sensing signal at a level effective to maintain the detector output corresponding to the simulated condition even if said characteristics of the detector change, whereby the detector detects the physical quantity when said predetermined value thereof obtains even if the detector characteristics change.

2. An analog output test and correction system for an analog detector according to claim 1, further including means to poll the detector to determine the analog output is maintained at a value corresponding to said predetermined value of the physical quantity.

3. An analog output test and correction system for an analog detector according to claim 1, wherein said analog detector is of a photoelectric type having a light-emitting section for developing said test and sensing signal or light for detecting the physical quantity, and in which said means responsive to the test and sensing signal comprises a photodetecting section.

4. An analog output test and correction system for an analog detector as claimed in claim 1, wherein said second arithmetic section subtracts the output from the analog detector under the zero condition from the predetermined output from the analog detector and multiplies the subtraction result by said gradient.

5. An analog output test and correction system for an analog detector as claimed in claim 1, wherein said first arithmetic section calculates said gradient by dividing the value of the physical quantity under the simulated condition by the difference of the output under the simulated condition minus the output under the zero condition.

6. An analog output test and correction system for an analog detector as claimed in claim 1, wherein said second arithmetic section subtracts the output from the analog detector under the zero condition from the predetermined output from the analog detector and multiplies the substration result by said gradient.

7. An analog output test and correction system for an analog detector as claimed in claim 1, wherein said first arithmetic section calculates said gradient of values by dividing the value of the physical quantity under the simulated condition by the difference of the value of the output under the simulated condition minus the output under the zero condition.

8. An analog output test and correction system for an analog detector as claimed in claim 1, including means to indicate by an alarm when the physical quantity is detected at said predetermined value.

9. An analog output test and correction system for an analog detector as claimed in claim 1, further including a plurality of parallel analog detectors disposed in parallel with the first-mentioned analog detector and simular thereto, said control section being connected to each of said detectors, and further including means to poll the individual analog detectors to ascertain when a given detector detects the physical quantity at said predetermined value.

10. An analog output test and correction system for an analog detector as claimed in claim 1, wherein said analog detector is provided with an output correction circuit comprising said first arithmetic section, said storage section, said second arithmetic section and a third arithmetic section for calculating from the value of the physical quantity calculated by said second arithmetic section a corrected output value of said analog detector in conformity with a predetermined correct output characteristic of such detector.

11. An analog output test and correction system for an analog detector as claimed in claim 10, wherein said third arithmetic section substitutes the value of the physical quantity calculated by said second arithmetic section in equations in conformity with said predetermined correct output characteristic of said detector.

12. An analog output test and correction system for an analog detector as claimed in claim 10, wherein said first arithmetic section calculates said gradient by dividing the value of the physical quantity the simulated condition by the difference of the output under the simulated condition minus the output under the zero condition.

13. An analog output test and correction system for an analog detector as claimed in claim 12, wherein said third arithmetic section substitutes the value of the physical quantity calculated by said second arithmetic section in equations in conformity with said predetermined correct output characteristics of said detector.

14. An analog output test and correction system for an analog detector as claimed in claim 10, wherein said second arithmetic section subtracts the output from the analog detector under the zero condition from the predetermined output from the analog detector and multiplies the substration result by said gradient.

15. An analog output test and correction system for an analog detector as claimed in claim 14, wherein said third arithmetic section substitutes the value of the physical quantity calculated by said second arithmetic section in equations in conformity with said predetermined correct output characteristics of said detector.

* * * * *